(12) United States Patent
Chung (10) Patent No.: US 11,485,169 B2
(45) Date of Patent: Nov. 1, 2022

(54) LUG ACCESSORIES FOR AUTOMOBILE WHEEL WITH DUAL BOLT PATTERNS

(71) Applicant: Design Infini, Inc., Irvine, CA (US)

(72) Inventor: Suny Chung, Corona, CA (US)

(73) Assignee: Design Infini, Inc., Irvine, CA (US)

( * ) Notice: Subject to any disclaimer, the term of this patent is extended or adjusted under 35 U.S.C. 154(b) by 948 days.

(21) Appl. No.: 16/261,446

(22) Filed: Jan. 29, 2019

(65) Prior Publication Data

US 2020/0238753 A1 Jul. 30, 2020

(51) Int. Cl.
*B60B 7/14* (2006.01)
*F16B 37/14* (2006.01)
*B60B 3/10* (2006.01)

(52) U.S. Cl.
CPC ............... *B60B 7/14* (2013.01); *F16B 37/14* (2013.01); *B60B 3/10* (2013.01)

(58) Field of Classification Search
CPC .. B60B 7/14; B60B 7/068; B60B 3/10; B60B 3/165; F16B 37/14; F16B 37/145
USPC .................................................. 301/35.632
See application file for complete search history.

(56) References Cited

U.S. PATENT DOCUMENTS

| | | | | |
|---|---|---|---|---|
| 3,222,976 | A * | 12/1965 | Holman | ........... F16B 37/14 81/436 |
| 3,664,708 | A * | 5/1972 | Verdier | ........... B60B 3/16 301/35.632 |
| 6,036,419 | A * | 3/2000 | Lanham | ........... F16B 37/14 411/405 |
| 7,287,819 | B2 | 10/2007 | McNeil | |
| 9,150,047 | B2 | 10/2015 | Noriega | |
| 9,701,156 | B2 | 7/2017 | Baiz et al. | |
| 2013/0106169 | A1 | 5/2013 | Chu | |
| 2014/0049096 | A1 * | 2/2014 | Hess | ........... B60B 3/147 301/95.101 |
| 2014/0103701 | A1 * | 4/2014 | Chung | ........... B60B 1/06 29/894.36 |
| 2017/0144478 | A1 * | 5/2017 | Baiz | ........... B60B 7/14 |

(Continued)

FOREIGN PATENT DOCUMENTS

CN          108105248 A  *  6/2018  ............. F16B 37/14

OTHER PUBLICATIONS

Machine Translation of CN 108105248 A, 6 Pages (Year: 2018).*

*Primary Examiner* — S. Joseph Morano
*Assistant Examiner* — Emily G. Castonguay
(74) *Attorney, Agent, or Firm* — Knobbe, Martens, Olson & Bear, LLP (57) ABSTRACT

An automobile wheel can include an outer rim, a hub, and a plurality of lug accessories. The hub, which is generally at the center of the automobile wheel, can have a plurality of lug holes. The plurality of lug accessories can be partially disposed in some, but not all, of the lug holes while leaving the remaining lug holes open. The open lug holes can receive a threaded stud from an automobile wheel hub assembly when the automobile wheel is mounted to the automobile wheel hub assembly. Each lug accessory can have a lug stud and a lug cap. The lug stud can have a flange and a linear member, with the linear member attached to the flange and extending to a free end. The flange can contact a rear surface of the hub when the linear member is inserted into a lug hole. The lug cap can extend over and couple to an opposite end of the linear member from the flange.

7 Claims, 6 Drawing Sheets

(56) References Cited

U.S. PATENT DOCUMENTS

2017/0241468 A1\* 8/2017 Wright ................. F16B 37/145
2019/0003516 A1\* 1/2019 Aoshima ............. F16B 37/0857

\* cited by examiner

LUG ACCESSORIES FOR AUTOMOBILE WHEEL WITH DUAL BOLT PATTERNS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present invention relates generally to automotive wheel accessories and, more particularly, to a lug accessory that can removably connect to an existing automotive wheel.

Description of the Related Art

Wheeled vehicles commonly include wheel hub assemblies that are rotatably coupled to the vehicle's axles and threaded wheel studs protruding outward from wheel hub assemblies. The threaded wheel studs are configured to facilitate the attachment of wheels to the wheel hub assemblies. In particular, wheels commonly include a series of openings corresponding to the threaded wheel studs on the wheel hub assemblies such that the wheels may be slid onto the threaded wheel studs. Once the threaded wheel studs are received in the openings, the wheels may be secured to the wheel hub assemblies by a series of lug nuts screwed onto ends of the threaded wheel studs. Alternatively, the wheel hub assemblies may include a series of threaded holes and the wheels may be secured to the wheel hub assemblies of the vehicle by a series of lug bolts extending through the openings in the wheels and into the threaded holes in the wheel hub assemblies. Additionally, wheels also commonly include a center bore for receiving a hub protruding outward from the wheel hub assembly.

The number of threaded wheel studs or threaded holes in each wheel hub assembly typically varies depending upon the type of vehicle. For instance, custom-built high performance vehicles, commonly referred to as tuner vehicles, typically include eight to ten threaded wheel studs or threaded holes. In contrast, many luxury automobiles include only four or five wheel studs or threaded holes. Accordingly, the number of openings in the wheel typically varies based upon the type of vehicle on which the wheel is designed to be installed (e.g., wheels designed for luxury vehicles typically have four or five openings, which corresponds to the number of threaded studs or holes in the wheel hub assembly). Thus, a user's potential choice of wheels is typically limited to those wheels that have the appropriate number of openings. Alternatively, the user could purchase replacement wheel hub assemblies having the appropriate number of threaded wheel studs or threaded holes based upon the user's wheel selection. For instance, a user who desires to switch between tuner-style wheels and luxury wheels conventionally purchases two different sets of wheels and two different sets of wheel hub assemblies. However, purchasing two different sets of wheels and corresponding wheel hub assemblies, and storing the set not currently installed on the user's vehicle, is costly and inconvenient. Moreover, removing and replacing the vehicle's wheels and wheel hub assemblies is both time consuming and cumbersome.

SUMMARY

According to one aspect, an automobile wheel is provided. The automobile wheel can include an outer rim, a hub, and a plurality of lug accessories. The hub, which is generally at the center of the automobile wheel, can have a plurality of lug holes. The plurality of lug accessories can be partially disposed in some of the lug holes while leaving the remaining lug holes open. The open lug holes can receive a threaded stud from an automobile wheel hub assembly when the automobile wheel is mounted to the automobile wheel hub assembly. Each lug accessory can have a lug stud and a lug cap. The lug stud can have a flange and a linear member, with the linear member attached to the flange and extending to a free end. The flange can contact a rear surface of the hub when the linear member is inserted into a lug hole. The lug cap can extend over and couple to an opposite end of the linear member from the flange.

In another aspect, an automobile wheel lug accessory is provided. The automobile wheel lug accessory can include a lug cap and a lug stud. The lug stud can have a flange and a linear member, with the linear member connecting to the flange at one end of the linear member. The lug cap can connect with the lug stud by forming a connection between the linear member and the lug cap such that once connected, the lug cap contacts a first surface of a wheel hub and the flange contacts a second surface of the wheel hub. The contact between the first and second surface of the wheel hub can stabilize at least a part of the lug cap and lug stud within a lug hole of the wheel hub. Furthermore, the connection between the lug cap and lug stud does not inhibit the wheel hub of a wheel from being mounted to an automobile wheel hub assembly.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to an automobile wheel 100 with one or more (e.g., a plurality) of removable and interchangeable lug accessories 111, as illustrated in FIGS. 1-6. The lug accessories 111 can be removably placed within one or more lug holes or openings 110 of the wheel 100 (e.g., some but not all of the lug holes 110). Each lug accessory 111 can optionally have two parts: a lug cap 120 and a lug stud 130. The lug cap 120 and lug stud 130 can removably attach or couple together on opposing sides of a wheel hub 103 located generally at the center of the wheel 100.

Advantageously, the lug accessories 111 allow a user to expand their potential selection of wheels 100 (e.g., to utilize both wheels made for custom-built high performance vehicles having eight to ten lug holes, as well as wheels made for luxury automobiles having four or five lug holes). Therefore, by using the one or more lug accessories 111, a user can select a wheel 100 with more lug holes or openings 110 than corresponding threaded bolts/studs on the vehicle's wheel hub. The lug accessories 111 can be removably installed on the wheel 100 to occupy the unused lug holes 110 (i.e., the lug holes 110 that do not receive threaded studs of the vehicle's wheel hub), which advantageously allows a user to use the same wheel 100 on vehicles having wheel hubs with different bolt patterns (or use wheels 100 having different numbers of lug holes 110 on the same vehicle wheel hub having a set number of threaded bolts/studs). Advantageously, the removable lug accessories 111 can have different designs, allowing the user to customize the look of the wheel 100 and thereby improve the aesthetics of the wheel 100 and vehicle (e.g., by not leaving unoccupied lug holes 110 in the wheel 100 once the wheel 100 is mounted to the vehicle wheel hub).

Figure 1:
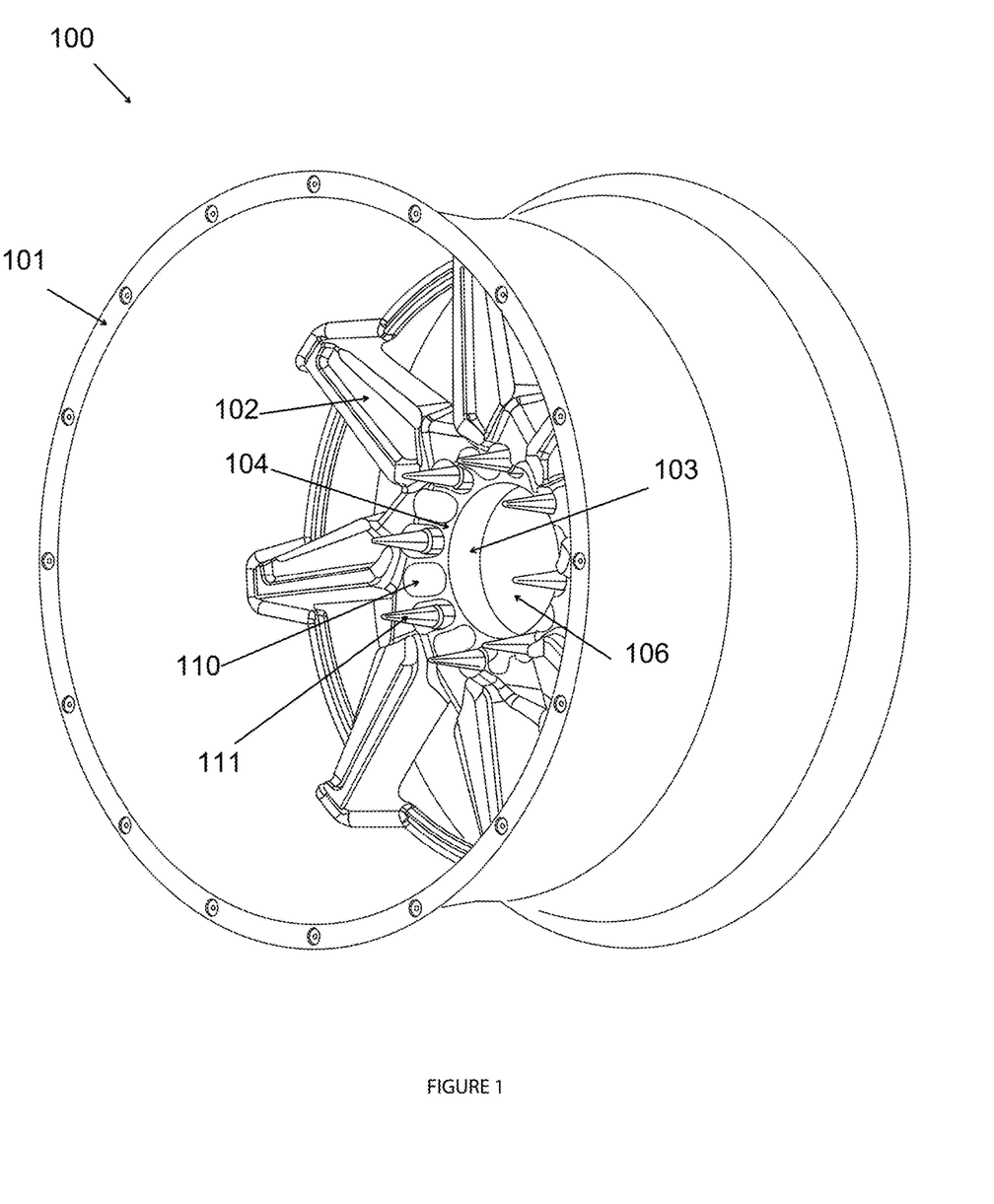
FIG. 1 is a schematic front perspective assembled view of an automobile rim with lug accessories.
Figure 2:
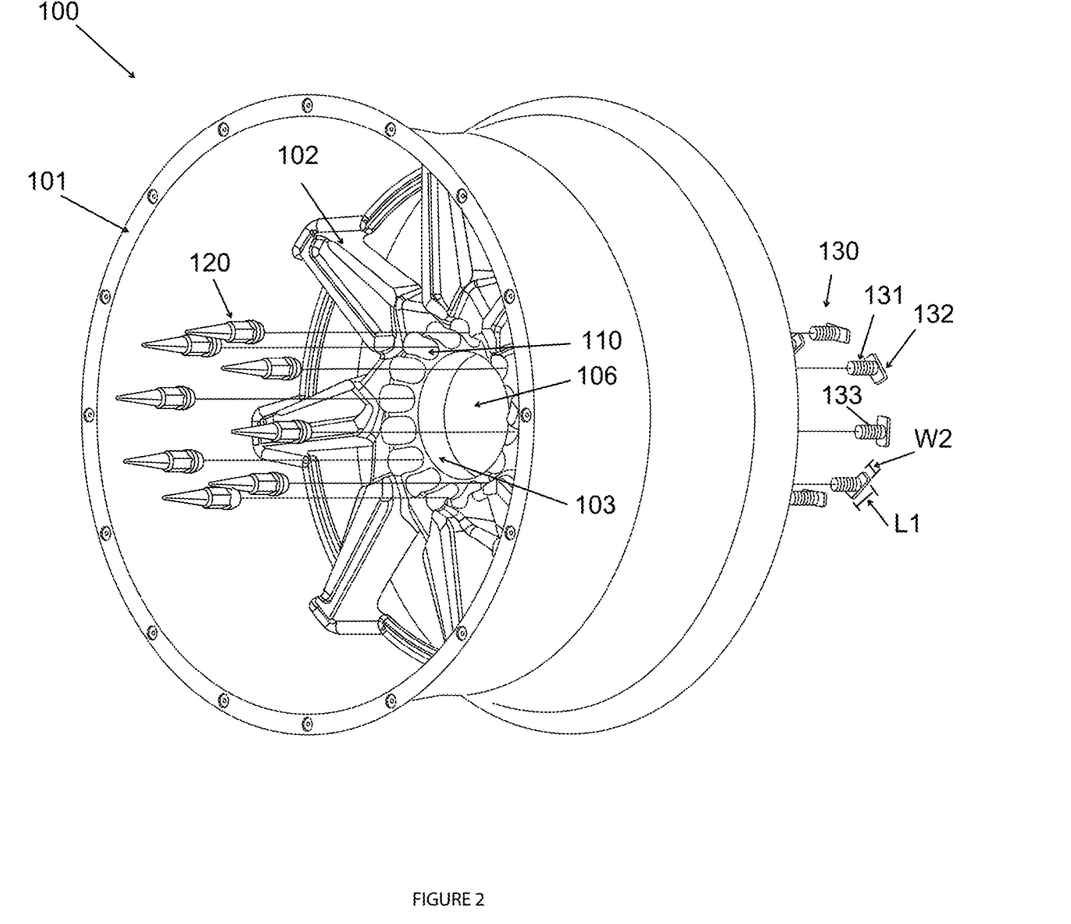
FIG. 2 is a schematic front perspective exploded view of an automobile rim with lug accessories.

With continued reference to FIGS. 1-6, the wheel 100 has an outer rim 101, a plurality of spokes 102, a hub 103 (located generally at about a central axis of the wheel 100), and a center bore 106 (located generally at a center of the hub 103, about the central axis of the wheel 100). As shown in FIG. 1, the spokes 102 extend out of the outer rim 101 and connect to the hub 103. A plurality of lug holes 110 are formed in the hub 103 and extend through the hub 103 from a front surface of the hub 103 to a rear surface of the hub 103. In other wheel designs, the spokes 102 are excluded and a continuous surface extends between the hub 103 and the outer rim 101. The center bore 106 and lug holes 110 can mate or couple with a vehicle's wheel hub. Optionally, the center of the vehicle's wheel hub can extend at least partially into (e.g., extend completely through and protrude from) the center bore 106, while threaded bolts/studs from the vehicle's wheel hub extend at least partially into (e.g., extend completely through, optionally protrude through) the lug holes 110. The wheel 100 can be secured to the vehicle's wheel hub by threading lugs (or lug nuts) onto the vehicle wheel hub's threaded bolts/studs.

In some implementations, the wheel 100 will have more lug holes 110 than the vehicle wheel hub has threaded studs, so that some of the lug holes 110 are unoccupied. Lug accessories 111 can be removably installed in the unoccupied lug holes 110. For example, in FIG. 1, the lug accessories 111 are placed in every other lug hole 110. The remaining lug holes 110 can receive threaded bolts/studs from the vehicle wheel hub to secure the wheel 100 to the vehicle's wheel hub. Optionally, the lug accessories 111 will not be placed in every unoccupied lug hole 110. A person having ordinary skill in the art will recognize a user can choose to leave any number of lug holes 110 unoccupied, including any range from one to ten lug holes 110.

Figure 3:
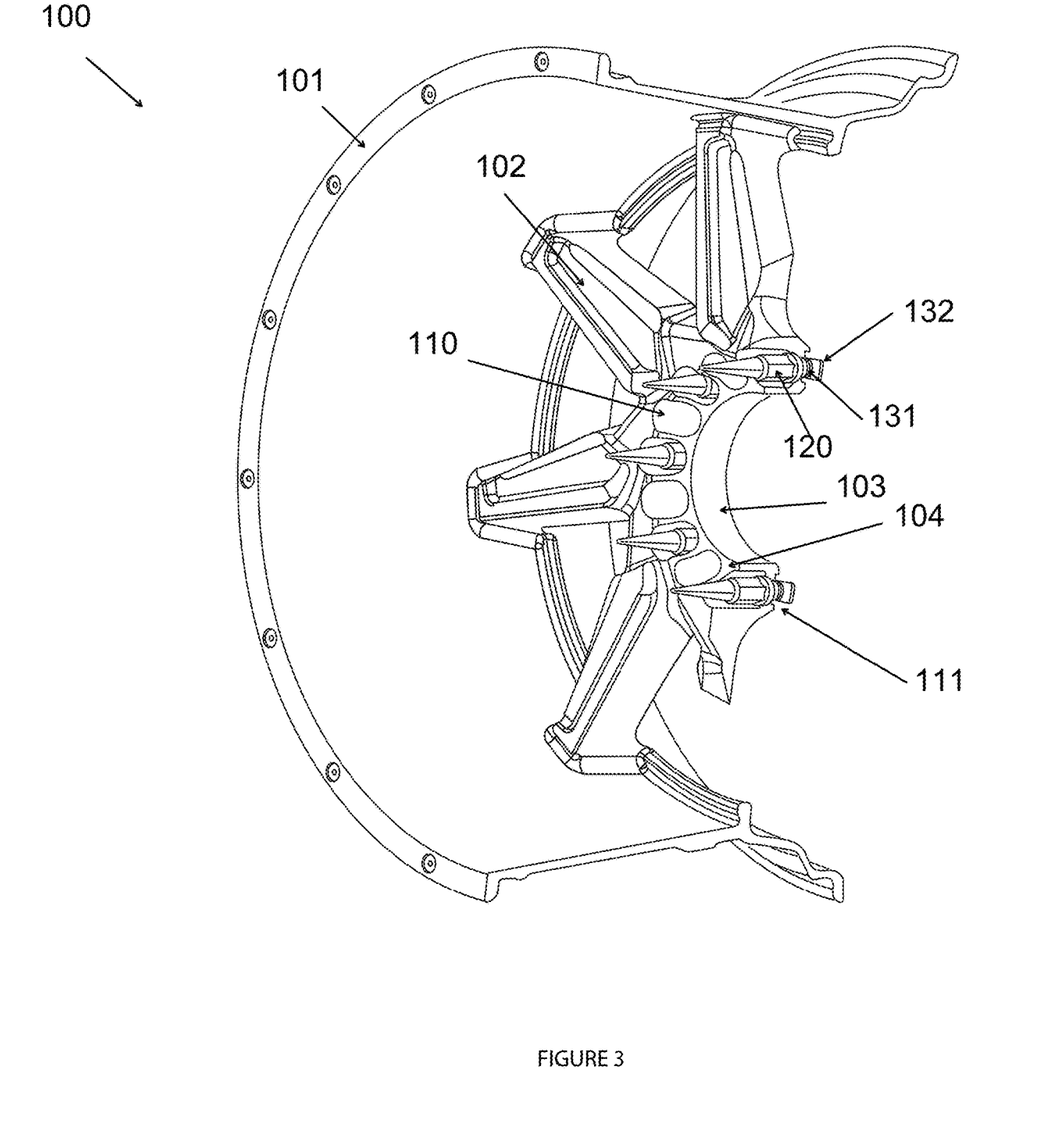
FIG. 3 is a schematic front perspective cross-sectional view of an automobile rim with lug accessories.
Figure 4:
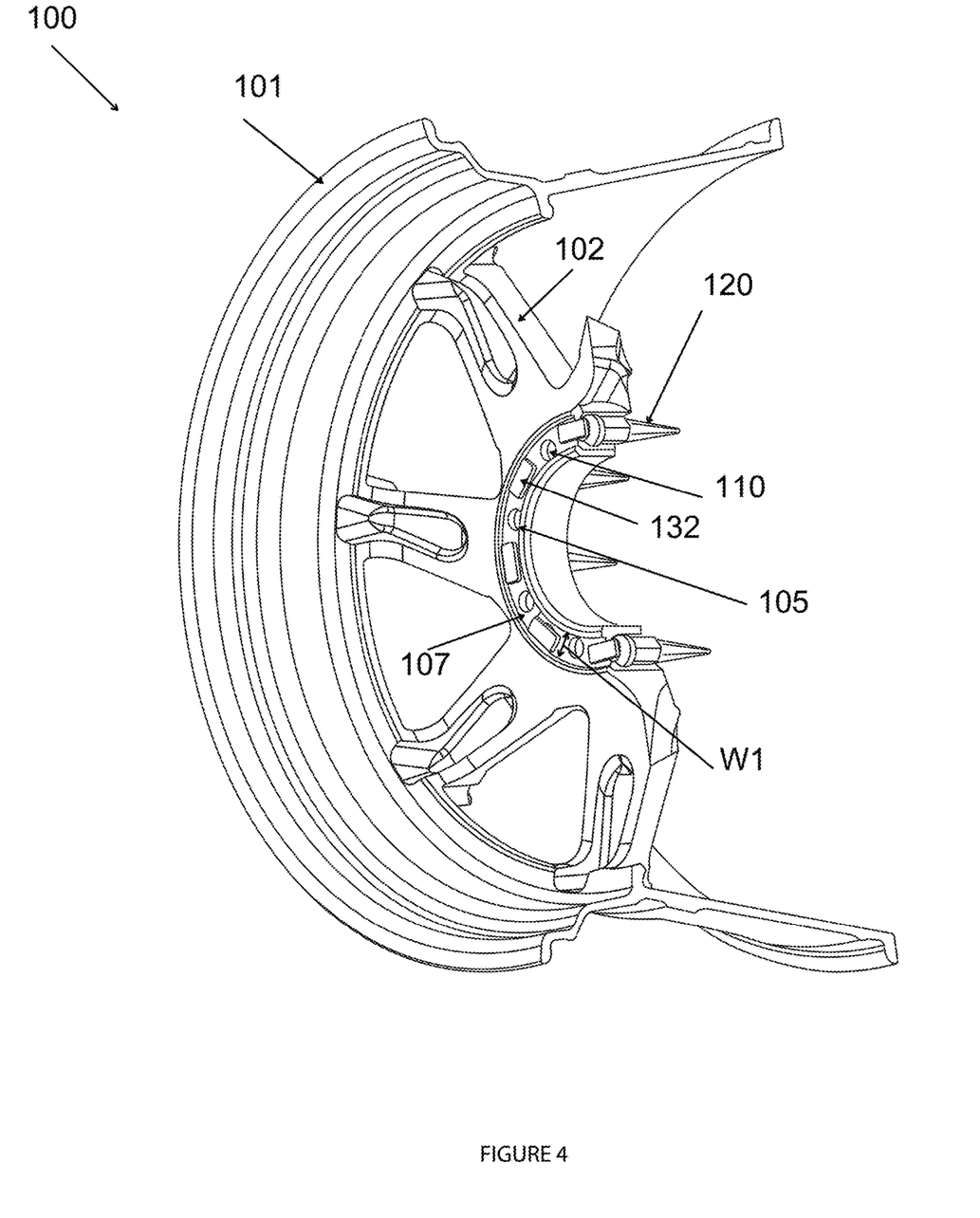
FIG. 4 is a schematic rear perspective cross-sectional view of an automobile rim with lug accessories.

With reference to FIGS. 2-6, the lug accessory 111 can include the lug cap 120 and the lug stud 130. The lug cap 120 and lug stud 130 are detachable from each other. The lug cap 120 can mate or couple with the lug stud 130 on opposing sides of the hub 103. For example, as illustrated in FIGS. 3 and 4, the lug cap 120 can be inserted into the lug hole 110 through a front hub surface 104 while the lug stud 130 can be inserted into the lug hole 110 through a rear hub surface 105, the lug cap 120 coupling to the lug stud 130 to secure the lug accessory 111 to the wheel 100.

The lug stud 130 can have a linear member 131. The size and shape of the linear member 131 allows it to be placed (e.g., at least partially inserted) within a lug hole 110. The linear member 131 can be shaped in a variety of different ways, including, but not limited to, cylindrical, hexagonal, triangular, conical, pyramidal, hemispherical, rectangular, pentagonal, and octagonal. A person having ordinary skill in the art will recognize the linear member 131 can have other shapes than the shapes previously described. The width of the linear member 131 is smaller than the diameter of the lug hole 110, so as to allow the linear member 131 to be inserted into the lug hole 110. Optionally, the linear member 131 defines a male member that is removably received in a female opening of the lug cap 120 to thereby couple the lug cap 120 to the lug stud 130. In another implementation, the linear member 131 defines a female opening (e.g., has a bore) that removably receives a male member (e.g., post, protrusion) of the lug cap 120 to thereby couple the lug cap 120 to the lug stud 130.

Optionally, the lug stud 130 can have a flange 132. The size and shape of the flange 132 advantageously inhibits (e.g., prevents) the entire lug stud 130 from being placed within (e.g., extending through) the lug hole 110, which prevents the lug stud 130 from sliding or falling through the lug hole 110. Optionally, the flange 132 can directly contact the rear hub surface 105 of the wheel 100, with the contact between the flange 132 and rear hub surface 105 preventing the entire lug stud 130 from being placed within the lug hole 110. The flange 132 can be shaped in a variety of different ways, including, but not limited to, cylindrical, hexagonal, triangular, conical, pyramidal, hemispherical, rectangular, pentagonal, and octagonal. A person having ordinary skill in the art will recognize the flange 132 can have other shapes than the shapes previously described. Optionally, one or both of the width and length of the flange 132 is larger than a diameter of the lug hole 110, so as to prevent the entire lug stud 130 from being placed within (e.g., extending through) the lug hole 110. Advantageously, the flange 132 can be sized and shaped so as not to conflict or interfere with a user placing the wheel 100 on a vehicle's wheel hub. In some implementations, the flange 132 can contact the rear hub surface 105 but not contact the vehicle's wheel hub. In some implementations, the flange 132 has a small thickness (has a low profile), so as to prevent the flange 132 from contacting the vehicle's wheel hub. In some implementations, the flange 132 is sized to fit within a rear hub groove or recess 107 such that the flange 132 does not protrude past the rear hub surface 105. By fitting within the rear hub groove 107, the flange 132 advantageously does not contact the vehicle's wheel hub. In some embodiments, the flange 132 does contact the vehicle's wheel hub, but the rear hub surface 105 optionally is substantially flush with the vehicle's wheel hub. As best shown in FIG. 4, a width W1 of the rear hub groove or recess 107 is optionally greater than a width W2 of the flange 132 but smaller than a length L1 of the flange 132, thereby facilitating the coupling of the lug cap 120 to the lug stud 130 by preventing the flange 132 from rotating within the rear hub groove or recess 107 while the lug cap 120 is coupled to the lug stud 130.

Figure 5:
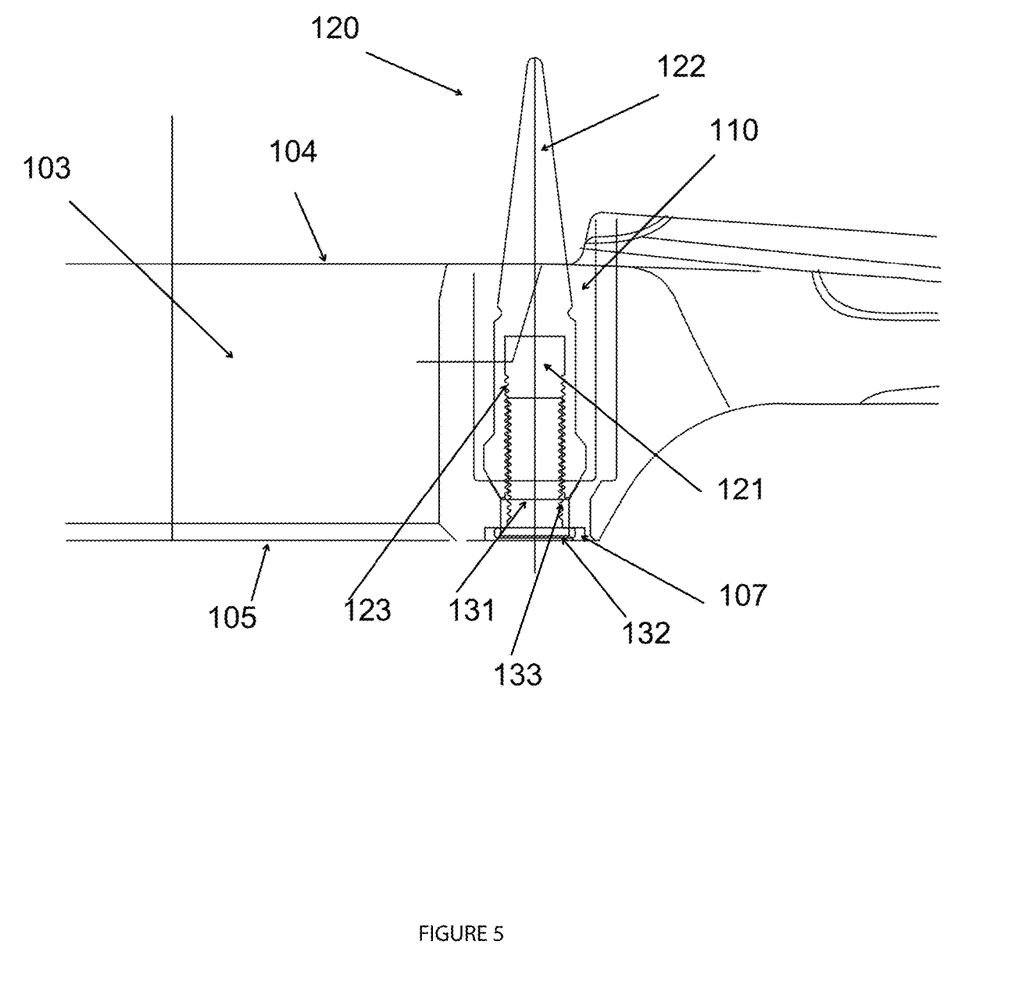
FIG. 5 is a schematic cross-sectional assembled side view of a coupled lug cap and lug stud within a lug hole of an automobile rim
Figure 6:
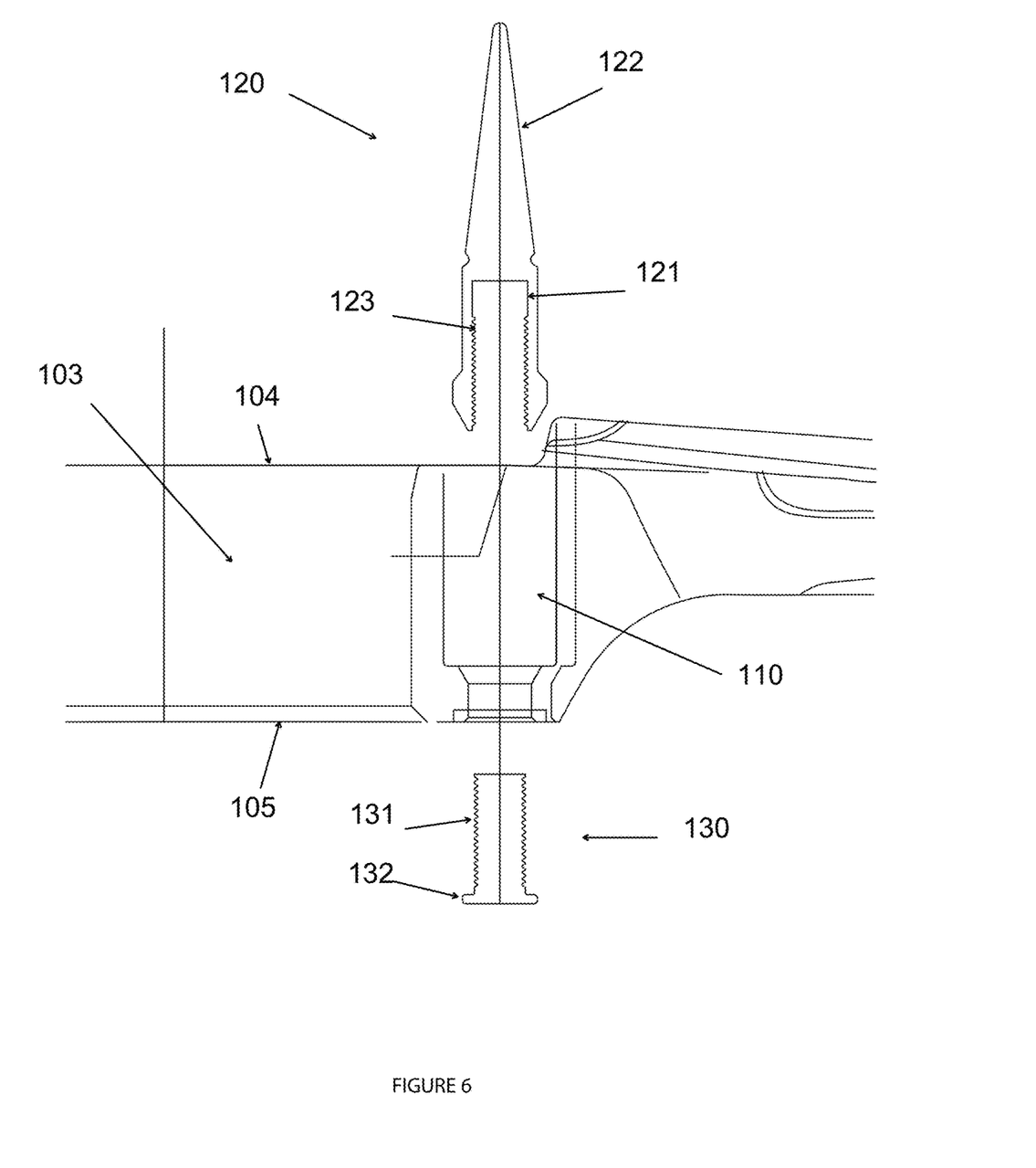
FIG. 6 is a schematic cross-sectional exploded side view of a lug cap and lug stud according to FIG. 5.

With reference to FIGS. 5 and 6, the lug cap 120 can mate or couple with the lug stud 130. For example, as illustrated in FIG. 5, the lug cap 120 optionally forms a threaded connection with the lug stud 130. For example, the lug cap 120 can have a threaded opening or bore 123 which can threadably mate or couple with a threaded surface 133 of the linear member 131 of the lug stud 130, where the linear member 131 is inserted into the threaded opening or bore 123. In another implementation, the lug cap 120 can have a threaded male member that is inserted into a threaded female member of the lug stud 130 to threadably couple the lug cap 120 to the lug stud 130.

A person having ordinary skill in the art will recognize the lug cap 120 and lug stud 130 can mate or couple together in a variety of suitable ways including, but not limited to, as self-tapping fasteners (e.g., the lug stud 130 being a self-tapping screw that is inserted in the lug cap 120), snap-fit connectors, press-fit connectors, key and slot connectors, pin and socket connectors, compression connectors (e.g. telescoping clamps, compression rings, etc.), and other suitable mechanical fasteners. In other implementations, the lug cap 120 and lug stud 130 can be mated together using a more permanent connection, such as, for instance, bonding (e.g., with an adhesive), welding, and brazing. In some embodiments, the lug cap 120 can have a threaded stud, rod, or other male mating connector that can mate with a corresponding female connector within the lug stud 130. In some embodiments, the lug accessory 111 comprises only a lug cap 120, which can mate with a corresponding connector attached to the hub. Once the lug cap 120 and lug stud 130 are mated together on opposing sides of the hub 103, the lug accessory 111 is substantially stationary within the lug hole 110.

The lug cap 120 can have a variety of different shapes. A person having ordinary skill in the art will recognize the lug cap 120 can be shaped in a variety of ways. For example, the lug cap 120 can have a spherical, hemispherical, cylindrical, hexagonal, triangular, conical, pyramidal, hemispherical, rectangular, pentagonal, or octagonal shape; however, the lug cap 120 can have other suitable shapes. The lug cap 120 can have different sizes. For example, as illustrated in FIG. 5, the top of the lug cap 122 extends beyond (e.g., protrudes past) the front hub surface 104. In some embodiments, the top of the lug cap 122 is substantially flush with the front hub surface 104. In other embodiments, the top of the lug cap 122 is below (e.g., recessed relative to) the front hub surface 104. Optionally, the size and shape of the lug cap 120 is designed so as not to contact a wheel's hub cap, or to prevent a user from placing or removing a hub cap from a rim 100. Optionally, the lug cap 120 can have multiple detachable parts. For example, a top portion of the lug cap 122 can detach from a body of the lug cap 121. The top portion of the lug cap 122 can reattach to the body of the lug cap 121 through common fastener techniques, such as, for instance, a threaded connection, snap-fit connection, or compression connection. In this manner, a user can advantageously attach different (e.g., differently shaped) lug cap tops 122 to the same lug cap body 121 without detaching or decoupling the lug cap body 121 from the lug stud 130, thereby allowing the user to alter the look of the wheel 100 (e.g., to customize the wheels 100 on the automobile by using differently shaped lug caps 120 or differently shaped lug cap tops 122).

The lug accessory 111 can have anti-theft features. For example, the lug cap 120 can be mated or coupled with the lug stud 130 so as to prevent the lug cap 120 from detaching from the lug stud 130 without the user's authorization. The lug cap 120 can require a specialized lug key to tighten and loosen the lug cap's 120 connection with the lug stud 130. The lug cap 120 can have a unique outer surface which would require the specialized key to loosen and tighten the lug cap 120, as the unique outer surface prevents conventional socket wrenches, lug wrenches, and other tools from gripping the lug cap's 120 outer surface. A person having ordinary skill in the art will recognize the lug cap's 120 outer surface can be shaped in a variety of ways so as to prevent theft. For example, the lug cap's 120 outer surface can be rounded, conical-shaped, pyramidal-shaped, or shaped in other fashions that prevent a standard lug or socket wrench from loosening the lug cap 120 from the lug stud 130.

The lug accessory 111 can be manufactured using a variety of different materials and methods. For example, the lug accessory 111 may be made of any suitably strong and durable material, such as, for instance, metal (e.g., aluminum or steel), metal alloy (e.g., aluminum alloys), or carbon fiber reinforced plastic, or a plastic material. The lug accessory may be made by any suitable process, such as, for instance, machining, milling, water jet cutting, laser cutting, stamping, pressing, sheet metal drawing, molding, casting, rapid prototyping using additive manufacturing techniques, or any combination thereof.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations.

Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An automobile wheel, comprising:
    an outer rim;
    a hub defined generally at the center of the automobile wheel, the hub having a first plurality of lug holes; and
    a plurality of lug accessories configured to be at least partially disposed in a subset of the first plurality of lug holes such that the remaining lug holes in the first plurality of lug holes remain open and are configured to receive a plurality of threaded studs of an automobile wheel hub assembly therein when the automobile wheel is mounted to the automobile wheel hub assembly, each of the lug accessories comprising
        a lug stud having a flange and a linear member attached to the flange and extending to a free end, the flange configured to contact a rear surface of the hub when the linear member is inserted through one of the lug holes, and
        a lug cap configured to removably extend over and couple to an opposite end of the linear member from the flange;
    wherein the rear surface of the hub comprises a groove and wherein the flange fits within the groove so that the flange does not protrude past the rear surface of the hub when the linear member is inserted through one of the lug holes, the width of groove being smaller than a length of the flange.

2. The automobile wheel of claim 1, wherein the lug cap and the linear member are coupled by a threaded connection.

3. The automobile wheel of claim 1, wherein one of the lug cap or linear member is a male connection member and the other of the lug cap or linear member is a female connection member.

4. The automobile wheel of claim 1, wherein the width of the groove is greater than the width of the flange.

5. The automobile wheel of claim 1, wherein the lug cap forms a conical shape.

6. The automobile wheel of claim 1, wherein lug cap can be uncoupled from the linear member with a lug key.

7. The automobile wheel of claim 6, wherein the shape of the lug cap prevents a standard lug key from uncoupling the lug cap from the linear member.

* * * * *